(12) United States Patent
Chen

(10) Patent No.: US 12,248,199 B1
(45) Date of Patent: Mar. 11, 2025

(54) SPECTACLE TEMPLE SIDE SHIELD STRUCTURE

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 0 days.

(21) Appl. No.: 18/510,862

(22) Filed: Nov. 16, 2023

(51) Int. Cl.
*G02C 11/00* (2006.01)

(52) U.S. Cl.
CPC .......... *G02C 11/12* (2013.01); *G02C 2200/06* (2013.01); *G02C 2200/08* (2013.01)

(58) Field of Classification Search
CPC ........... G02C 11/12; G02C 2200/06; G02C 2200/08; G02C 5/14; G02C 5/146; G02C 5/16; G02C 5/20; G02C 5/22; G02C 5/18; G02C 7/16; A61F 9/045
USPC ............................................ 2/13, 15; 351/47
See application file for complete search history.

(56) References Cited

U.S. PATENT DOCUMENTS

| | | | | |
|---|---|---|---|---|
| 3,505,679 A * | 4/1970 | Bennett | | G02C 9/04 2/13 |
| 5,548,351 A * | 8/1996 | Hirschman | | G02C 11/00 351/44 |
| 6,984,036 B1 * | 1/2006 | Smith | | G02C 9/00 351/44 |
| 7,163,288 B1 * | 1/2007 | Jung | | G02C 11/12 351/44 |
| 2005/0078268 A1 * | 4/2005 | Froissard | | G02C 5/2254 351/46 |
| 2006/0268217 A1 * | 11/2006 | Teng | | G02C 11/12 351/41 |
| 2012/0212702 A1 * | 8/2012 | Jung | | G02C 11/12 351/158 |
| 2014/0340629 A1 * | 11/2014 | Sadler | | G02C 11/12 351/111 |
| 2016/0274382 A1 * | 9/2016 | Froissard | | G02C 11/12 |
| 2019/0086688 A1 * | 3/2019 | Chen | | G02C 11/12 |
| 2020/0133032 A1 * | 4/2020 | Li | | G02C 11/12 |
| 2020/0142223 A1 * | 5/2020 | Chen | | G02C 5/146 |
| 2020/0301167 A1 * | 9/2020 | Chen | | G02C 5/146 |
| 2021/0263344 A1 * | 8/2021 | Chen | | G02C 11/12 |

* cited by examiner

*Primary Examiner* — Amy Vanatta
(74) *Attorney, Agent, or Firm* — Rosenberg, Klein & Lee

(57) ABSTRACT

The invention relates to a spectacle temple side shield structure, wherein the two sides of the spectacle frame and the pivot joints of the temples pivotally connect to each other. Each of the temples has a detent seat corresponding with the pivot joint. The side shield device has a shielding piece arranged thereon and a detent unit provided on an inner edge of a top end of the shielding piece, wherein the detent unit has grooves correspondingly arranged on the upper and lower parts thereof, an elastic part formed between the upper and lower two corresponding grooves, and a detent protrusion protruding from the elastic part, which is latch-locked and fixed with the detent seat corresponding to each other. Therefore, users can choose different shapes and color patterns of the side shields according to their own preferences to assemble and fix them on both sides of the spectacle frame.

2 Claims, 6 Drawing Sheets

SPECTACLE TEMPLE SIDE SHIELD STRUCTURE

BACKGROUND OF THE PRESENT INVENTION

Field of Invention

The present invention relates to a spectacle temple side shield structure, in particular to a structure that is simpler and more convenient to assemble and will not fall off after assembly. It not only prevents strong wind and foreign objects from contacting the eyes to achieve the effect of protecting the eyes but also has aesthetic visual effects and enhances product competitiveness. Furthermore, it innovatively designs the spectacle temple side shield structure with increased practical and functional characteristics in its overall implementation and use.

Description of Related Arts

Common types of glasses can be roughly divided into optical glasses, sunglasses, sports glasses, night vision protective glasses, etc. in terms of function for users to choose and wear according to different times and different needs, so that most existing consumers usually have multiple pairs of glasses with different functions for easy replacement.

Among them, people are generally accustomed to wearing various types of goggles in order to protect their eyes from being hit by strong winds or being injured by collisions with foreign objects when engaging in certain jobs or performing high-speed activities. The covering portions of this type of goggles formed on both sides of the frame cover and fit around the user's eyes to prevent strong wind and foreign objects from contacting the eyes, thus achieving the effect of protecting the eyes.

However, although the above-mentioned goggles can provide users with the expected effect of protecting their eyes from strong winds and foreign object contact when worn, it has also been found in its actual operation and use that the covering portions provided on both sides of the frame of these types of goggles are directly extended and integrally formed on both sides of the frame, resulting in an extremely monotonous overall shape and color. Users cannot choose and match according to their preferences, which leads to the inability to effectively enhance the competitiveness of the product and still leaves room for improvement in the overall structural design.

In view of this, the inventor has relied on many years of rich design, development, and actual production experience in this related industry to research and improve the existing structure and deficiencies, and has provided a spectacle temple side shield structure to achieve better practical value.

SUMMARY OF THE PRESENT INVENTION

The main purpose of the present invention is to provide a spectacle temple side shield structure that mainly allows users to choose different shapes and colors of side shields according to their own preferences and needs and then assemble and fix the selected side shields on both sides of the spectacle frame, making assembly easier and more convenient and ensuring that they will not fall off after assembly, so that when the user wears the spectacle, the side shields can be used to cover and fit around the user's eyes to prevent strong wind and foreign objects from contacting the eyes, thereby protecting the eyes and providing a more beautiful visual effect, increasing the competitiveness of its products, and thereby increasing its practical and functional properties in its overall implementation and use.

The main purpose and effect of the spectacle temple side shield structure of the present invention are achieved by the following specific technical means:

which mainly includes a spectacle frame and side shield devices, wherein a pivot joint of two temples each is pivotally connected with both sides of the spectacle frame, and each of the temples has a detent seat corresponding with the pivot joint, wherein each of the side shield devices has a shielding piece arranged thereon for shielding, a detent unit provided on an inner edge of a top end of the shielding piece, at least one blocking bar protruded from an outer edge of the top end of the shielding piece, a space for accommodating the temple formed between the blocking bar and the detent unit, and a locking cover portion covering a top surface of the temple provided at an upper end of the detent unit, wherein the detent unit has grooves correspondingly arranged on the upper and lower parts thereof, an elastic part formed between the upper and lower two corresponding grooves, and a detent protrusion protruded from the elastic part, which is latch-locked and fixed with the detent seat of the temple of the spectacle frame corresponding to each other.

According to a preferred embodiment of the spectacle temple side shield structure of the present invention, the blocking bars are preferably disposed correspondingly on both sides of the detent unit.

DETAILED DESCRIPTION OF THE PREFERRED EMBODIMENT

In order to have a more complete and clear disclosure of the technical content, the purpose of creation and the effect achieved by the present invention, it is explained in detail below, and refer to the disclosed drawings and drawing numbers together.

Figure 1:
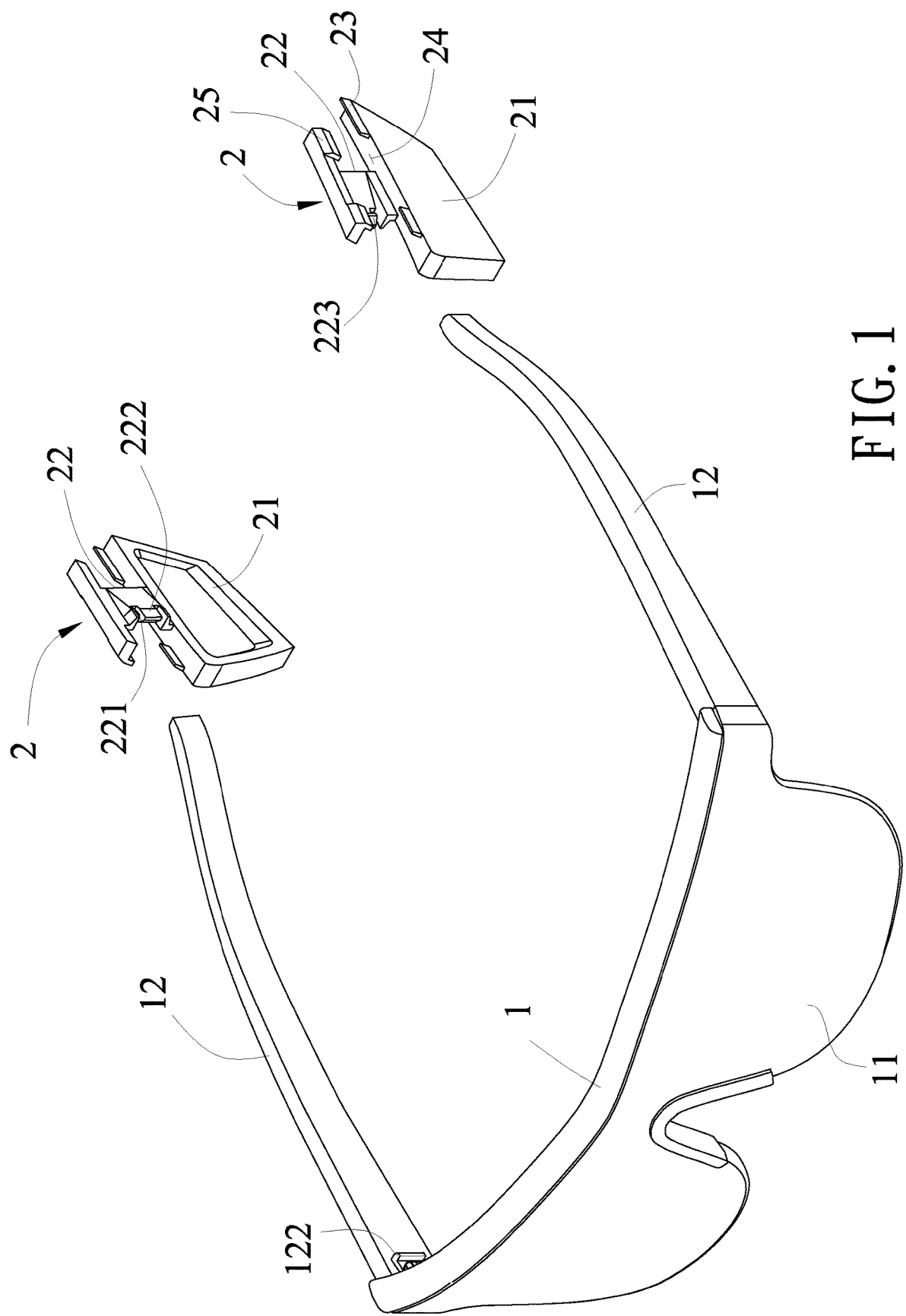
FIG. 1 is an exploded view according to the present invention.
Figure 2:
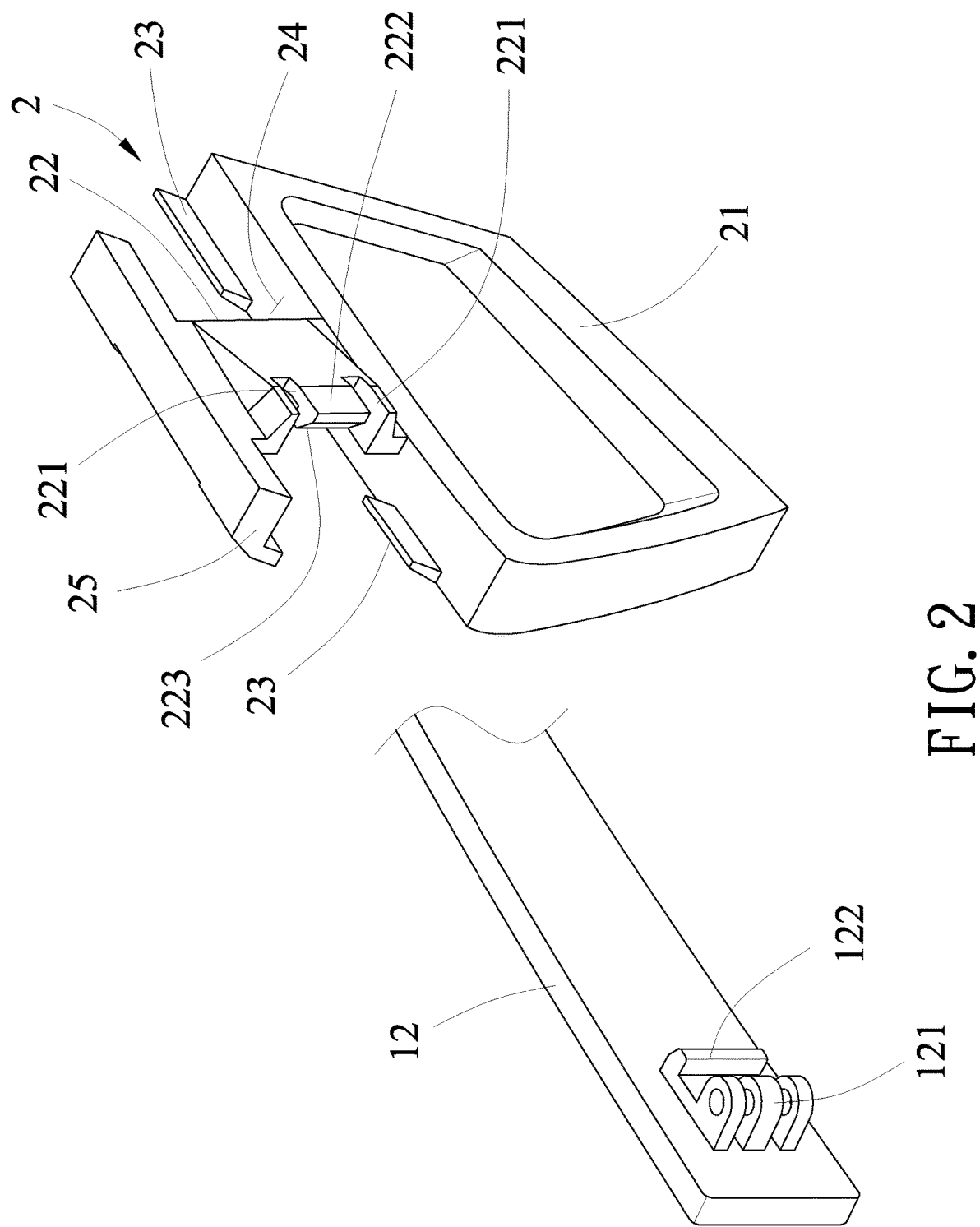
FIG. 2 is a partially exploded view according to the present invention.
Figure 3:
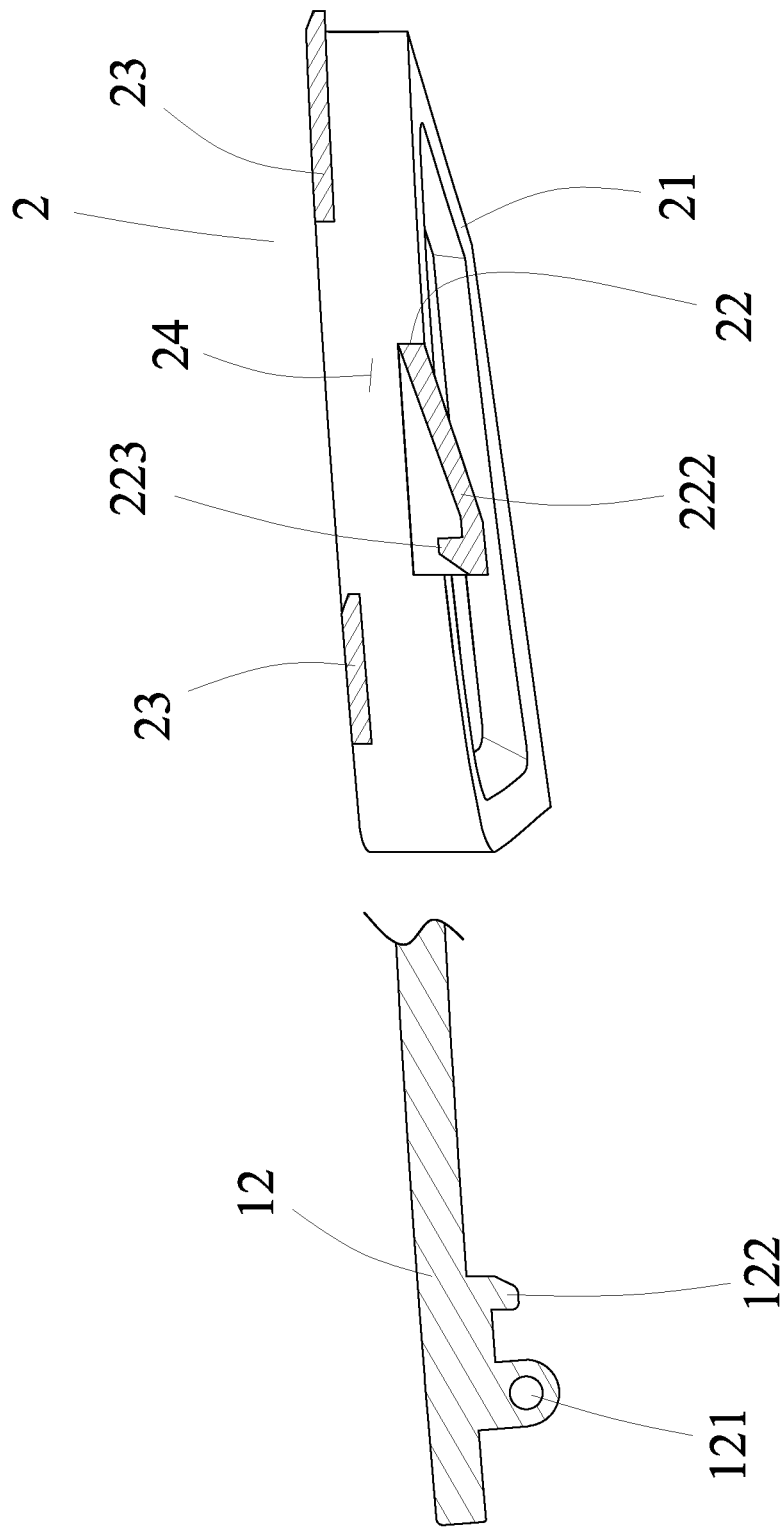
FIG. 3 is a partial top exploded view according to the present invention.

First, referring to FIG. 1, which is an exploded perspective view of the present invention; FIG. 2, which is a partially exploded perspective view of the present invention; and FIG. 3, which is a partial top exploded perspective view of the present invention, the present invention mainly includes a spectacle frame (1) and side shield devices (2), wherein the spectacle frame (1), which has lenses (11) assembled thereon, and temples (12) each have a pivot joint (121) and a detent seat (122), wherein the pivot joints (121) of the temples (12) are pivotally combined with the two sides of the spectacle frame (1), and each of the detent seats (122) is provided at the temple (12) corresponding to each of the pivot joints (121), wherein each of the side shield devices (2), which has a shielding piece (21) arranged thereon for shielding, a detent unit (22) provided on an inner edge of a top end of the shielding piece (21), at least one blocking bar (23) protruded from an outer edge of the top end of the shielding piece (21), a space (24) for accommodating the temple (12) formed between the blocking bar (23) and the detent unit (22), and a locking cover portion (25) covering a top surface of the temple (12) provided at an upper end of the detent unit (22), wherein the detent unit (22) has grooves (221) correspondingly arranged on the upper and lower parts thereof, an elastic part (222) formed between the upper and lower two corresponding grooves (221), and a detent protrusion (223) protruded from the elastic part (222), which is latch-locked and fixed with the detent seat (122) of the temple (12) of the spectacle frame (1) corresponding to each other, wherein the blocking bars (23) are preferably disposed correspondingly on both sides of the detent unit (22).

Figure 4:
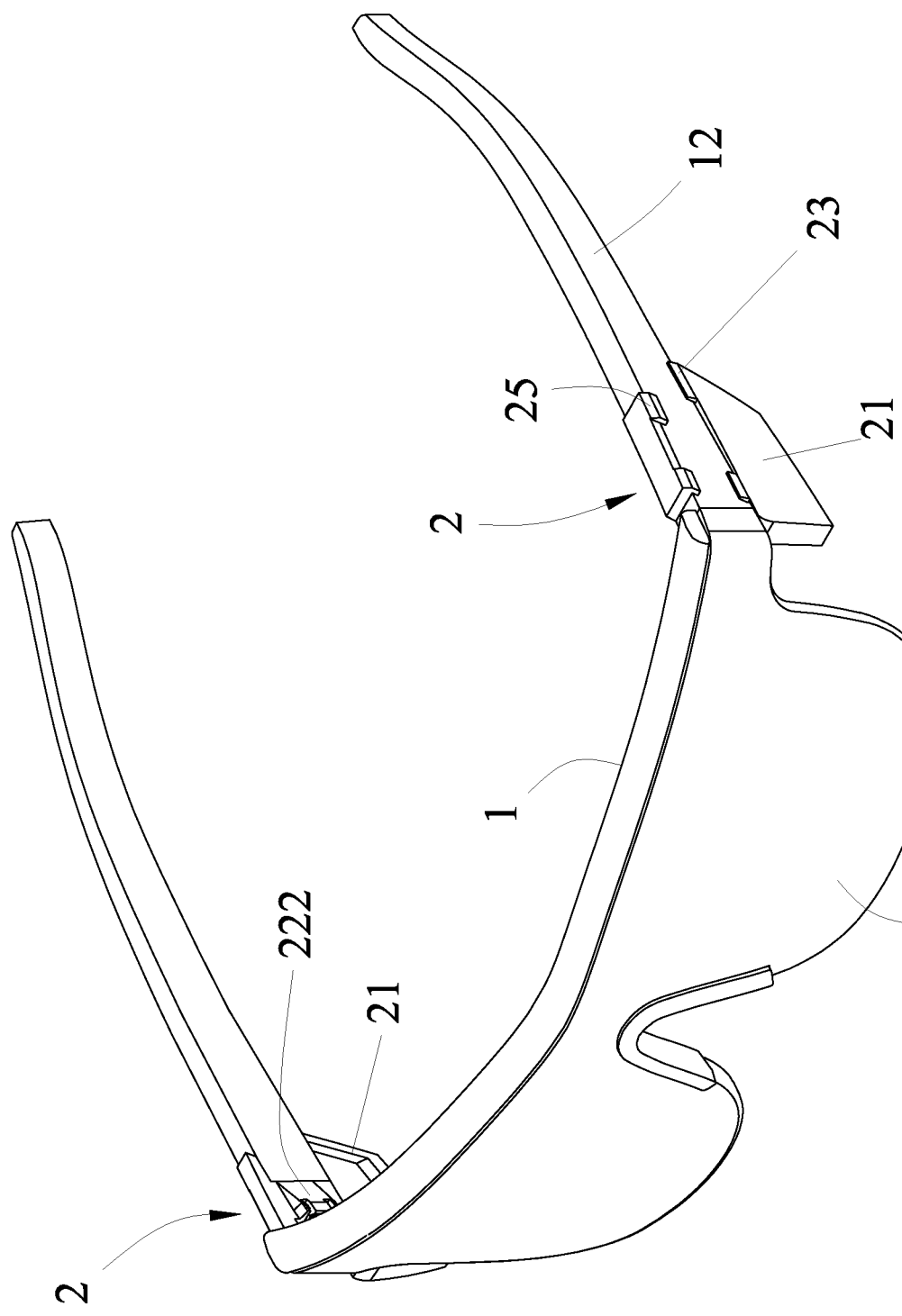
FIG. 4 is a perspective view according to the present invention.
Figure 5:
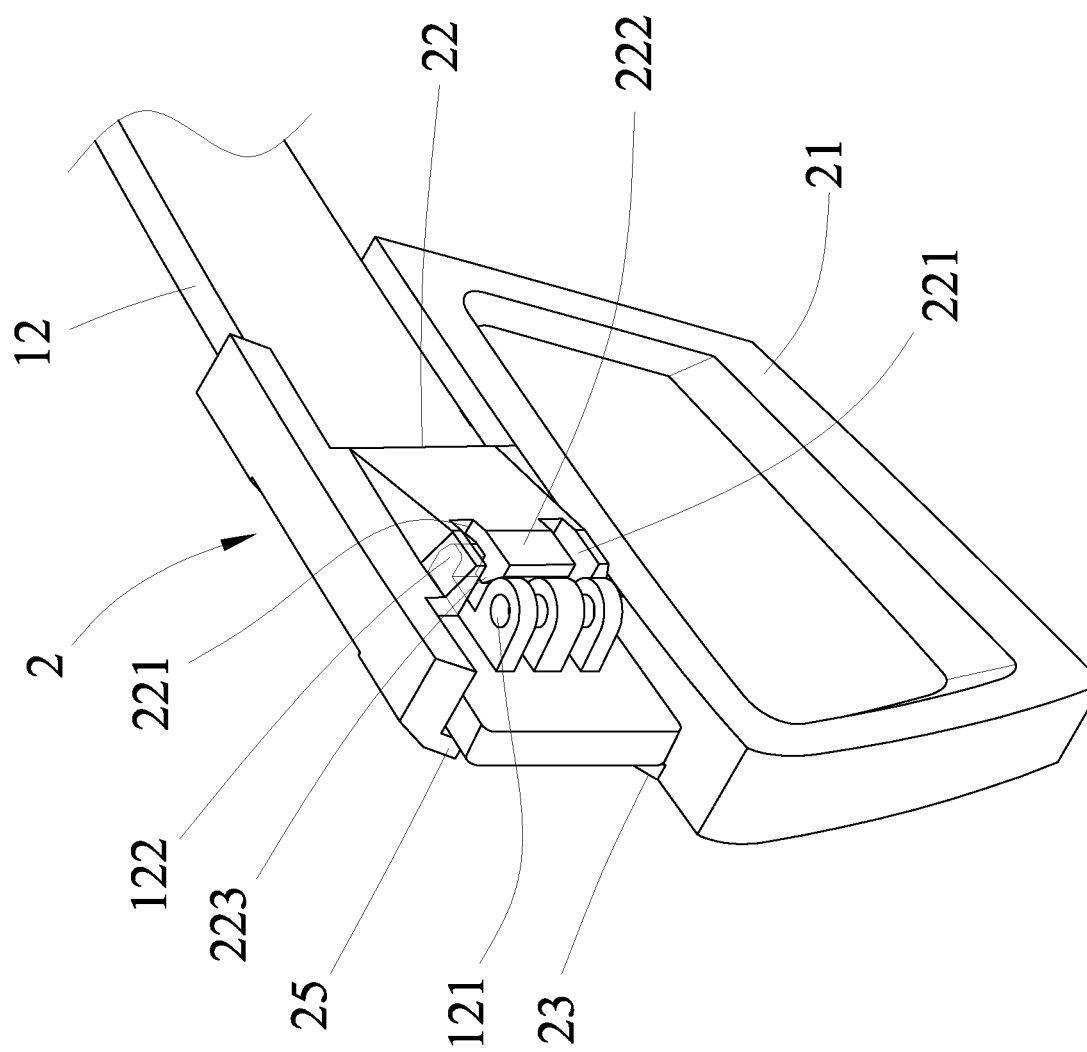
FIG. 5 is a perspective view of a partial assembly structure according to the present invention.
Figure 6:
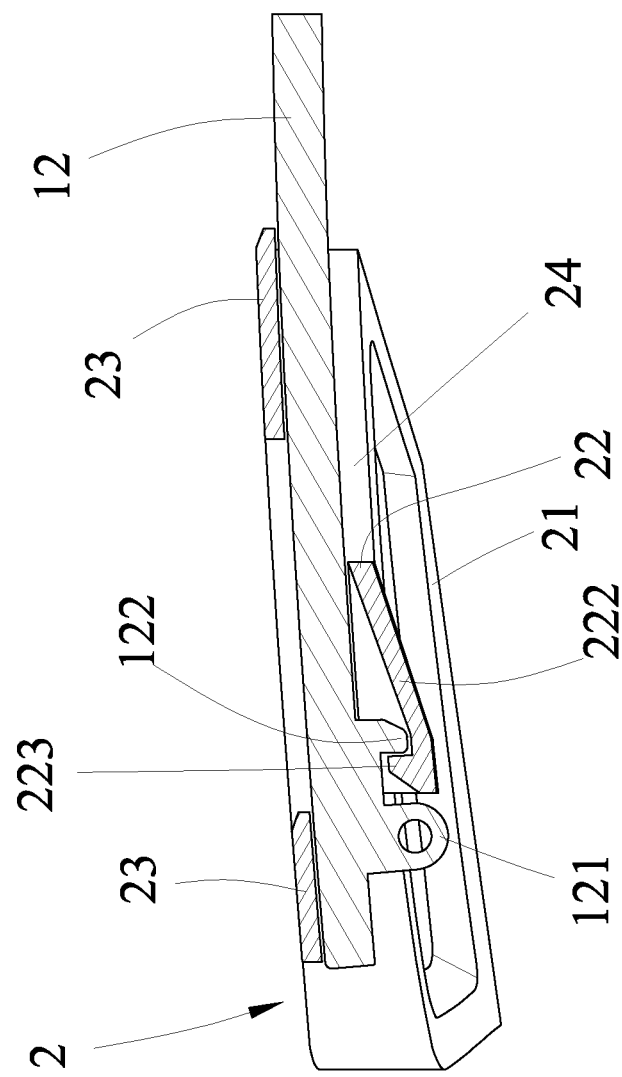
FIG. 6 is a partial top perspective view of the assembly structure according to the present invention.

In this way, referring to FIG. 4, which is a perspective view of the assembly structure of the present invention; FIG. 5, which is a partial perspective view of the assembly structure of the present invention; and FIG. 6, which is a partial top view of the assembly structure of the present invention, the present invention allows users to select the style of the side shield devices (2) to be paired with the spectacle frame (1) according to their preferences and needs. Each of the selected side shield devices (2) is assembled corresponding to the inner side of each of the temples (12), so that the temple (12) is accommodated in the space (24) formed between the blocking bar (23) and the detent unit (22) at the top end of the shielding piece (21), and the locking cover portion (25) at the upper end of the detent unit (22) covers the top surface of the temple (12) to limit the temple (12) so that each of the side shield devices (2) can utilize the space (24) is arranged to slide smoothly on the temple (12) and when the side shield device (2) is pushed toward the spectacle frame (1), the detent protrusion (223) protruded from the elastic part (222) of the detent unit (22) and the detent seat (122) of the temple (12) can latch and position each other. During the locking positioning process, the elastic part (222) of the detent unit (22) formed by the upper and lower corresponding grooves (221) can more smoothly and conveniently position the detent protrusion (223) with the detent seat (122), thereby firmly placing the side shield device (2) at the pivot joint (121) between the spectacle frame (1) and the temple (12), preventing the side shield device (2) from falling off. When the user wears spectacles, the side shield devices (2) can wrap around and fit to the surrounding area of the user's eyes, preventing strong wind and foreign objects from contacting the eyes, thereby achieving the function of eye protection.

With the above description, the implementation of the present invention can be understood. Compared with the conventional technical means, the invention mainly allows users to choose different shapes and color patterns of side shields according to their preferences and needs. Then assemble and fix the selected side shields on both sides of the spectacle frame. The assembly process is easier and more convenient, and it will not fall off after assembly and combination. When the user wears the spectacles, the side shields can be used to cover and fit around the user's eyes, which not only prevents strong wind and foreign objects from touching the eyes and achieves eye protection but also has aesthetic visual effects and increases product competitiveness. Moreover, it also enhances practicality and effectiveness in overall use.

What is claimed is:

1. A spectacle temple side shield structure, which comprises a spectacle frame and side shield devices, wherein a pivot joint of two temples each is pivotally connected with both sides of the spectacle frame, and each of the temples has a detent seat corresponding with the pivot joint, wherein each of the side shield devices has a shielding piece arranged thereon for shielding, a detent unit provided on an inner edge of a top end of the shielding piece, at least one blocking bar protruded from an outer edge of the top end of the shielding piece, a space for accommodating the temple formed between the blocking bar and the detent unit, and a locking cover portion covering a top surface of the temple provided at an upper end of the detent unit, wherein the detent unit has grooves correspondingly arranged on upper and lower parts thereof, an elastic part formed between the upper and lower two corresponding grooves, and a detent protrusion protruded from the elastic part, which is latch-locked and fixed with the detent seat of the temple of the spectacle frame corresponding to each other.

2. The spectacle temple side shield structure as claimed in claim 1, wherein the blocking bars are disposed correspondingly on both sides of the detent unit.

\* \* \* \* \*